United States Patent
Gioscia et al.

(10) Patent No.: US 7,693,546 B1
(45) Date of Patent: *Apr. 6, 2010

(54) COMPACT REMOVABLE VOICE HANDSET FOR AN INTEGRATED PORTABLE COMPUTER SYSTEM/MOBILE PHONE

(75) Inventors: Rich Gioscia, Santa Clara, CA (US); Masamichi Udagawa, New York, NY (US)

(73) Assignee: Palm, Inc., Sunnyvale, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 11/352,392

(22) Filed: Feb. 9, 2006

Related U.S. Application Data

(63) Continuation of application No. 09/855,250, filed on May 14, 2001, now Pat. No. 7,054,659.

(51) Int. Cl.
*H04M 1/00* (2006.01)
*H04Q 7/20* (2006.01)
(52) U.S. Cl. .......... 455/556.1; 455/41.2; 455/557
(58) Field of Classification Search ....... 455/41.2–41.3, 455/556.1–556.2, 557, 575.2, 569.1, 418
See application file for complete search history.

(56) References Cited

U.S. PATENT DOCUMENTS

| | | | |
|---|---|---|---|
| 4,661,659 A | 4/1987 | Nishimura | |
| 5,051,799 A | 9/1991 | Paul et al. | |
| 5,625,673 A | 4/1997 | Grewe et al. | |
| 5,719,936 A | 2/1998 | Hillenmayer | |
| 5,974,334 A * | 10/1999 | Jones, Jr. | 455/556.2 |
| 5,983,073 A * | 11/1999 | Ditzik | 455/11.1 |
| 6,014,573 A | 1/2000 | Lehtonen et al. | |
| 6,333,973 B1 | 12/2001 | Smith et al. | |
| 6,459,882 B1 * | 10/2002 | Palermo et al. | 455/41.1 |
| 6,622,018 B1 | 9/2003 | Erekson | |
| 6,717,801 B1 * | 4/2004 | Castell et al. | 361/683 |
| 6,741,870 B1 | 5/2004 | Holmstrom et al. | |
| 7,054,659 B2 * | 5/2006 | Gioscia et al. | 455/556.1 |
| 2002/0002707 A1 | 1/2002 | Ekel et al. | |
| 2002/0090099 A1 * | 7/2002 | Hwang | 381/312 |
| 2002/0102946 A1 | 8/2002 | SanGiovanni | |
| 2002/0166127 A1 | 11/2002 | Hamano et al. | |
| 2003/0208113 A1 | 11/2003 | Mault et al. | |

FOREIGN PATENT DOCUMENTS

| | | |
|---|---|---|
| EP | 0790732 | 8/1997 |
| WO | 0049731 | 7/2008 |

* cited by examiner

*Primary Examiner*—Lee Nguyen

(57) ABSTRACT

A compact removable voice handset for an integrated palmtop computer system/mobile phone is presented. The present invention is used in conjunction with a personal digital assistant (PDA). The PDA comprises electronics for wireless communications and a contact information database and a means for coupling the handset to the PDA. The present invention is compact such that when coupled to the PDA, there is minimal increase to the overall size and weight of the PDA. The present invention comprises a microphone and a speaker, and is communicatively coupled, via either a wireless connection or a wired connection, to the PDA. The handset comprises control elements such that the handset can be operated independent of the PDA. In one embodiment, the handset comprises a display and control elements configured for accessing the contact information database of the PDA, adjusting the volume of the handset, and for initiating or ending wireless communications.

15 Claims, 13 Drawing Sheets

COMPACT REMOVABLE VOICE HANDSET FOR AN INTEGRATED PORTABLE COMPUTER SYSTEM/MOBILE PHONE

RELATED APPLICATION

This patent application is a Continuation of commonly-owned patent application Ser. No. 09/855,250, filed on May 14, 2001, now U.S. Pat. No. 7,054,659 entitled "COMPACT REMOVABLE VOICE HANDSET FOR AN INTEGRATED PORTABLE COMPUTER SYSTEM/MOBILE PHONE," by Gioscia et al., which is incorporated herein by reference.

FIELD OF INVENTION

The present invention relates to the field of portable electronic devices such as palmtop computer systems and cellular telephones. Specifically, the present invention relates to a device combining portable computer system technology and cellular telephone technology.

BACKGROUND OF THE INVENTION

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

The emergence of the cellular phone technology in the last few years has revolutionized the telecommunications industry. Where in the past telephones were largely confined to homes, offices, and other stationary structures, cellular phone technology has made it possible for phones to be truly portable and exist nearly anywhere there are people.

Recently, the technology behind both palmtop computer systems and cellular phones has advanced to the point where it is proposed to integrate cellular phone capabilities into a palmtop computer system. However, both types of devices possess different modes of operation. For example, palmtop computer systems are handheld devices providing primarily a visual experience while cellular phones are held to the head of a user and provide primarily an auditory experience.

Integrated palmtop computer systems/cellular phones present concerns regarding accessibility and immediacy. Typical integrated palmtop computer systems/cellular phones limit a user's accessibility to each distinct function of the device. For example, a user is required to hold a cellular phone to their face, thereby restricting the use of the PDA functions, which require a user to be able to look at the device.

Furthermore, a cellular phone requires an immediate response to an incoming call, or the user risks missing the call. For example, a caller will only wait a matter of seconds for a person to answer their call, otherwise they will hang up. If a user is using the PDA function of an integrated palmtop computer system/cellular phone and receives an incoming call, the user must stop using the PDA functionality in order to answer the call.

In some integrated palmtop computer system/cellular phones, a user may not be able to operate the two devices at the same time. For example, a user operating the device as a cellular phone may desire to write a note or make an appointment on the PDA. At a minimum, the user will be forced to pause the phone call. However, the user may not be permitted to operate the PDA functionality while the device is being operated as a cellular phone, thus limiting the accessibility of the PDA functionality.

The form factor of the device plays a crucial role in whether or not users are comfortable operating the device. For example, manufacturers believe that some cellular phone users may be hesitant to use a cellular phone that is in the shape of a palmtop computer system. Likewise, a typical cellular phone display does not offer the size or interface functionality that a palmtop computer system does. The users of palmtop computer systems and cellular phones desire the benefits of each of the respective devices, and are unlikely to sacrifice these benefits if forced to compromise the form factor of the device.

SUMMARY OF THE INVENTION

Accordingly, a need exists for an electronic device that is both a palmtop computer system and a cellular phone. Furthermore, a need exists for the above electronic device to allow for the immediacy required for answering a phone call and still allowing for the accessibility of applications running on the palmtop computer system. A need exists for the above electronic device to provide the benefits of both a palmtop computer system and a cellular phone in one integrated device by allowing for common operations and functionality without compromising the form factor of either device. These and other objects and advantages of the present invention will become obvious to those of ordinary skill in the art after having read the following detailed description of the preferred embodiments which are illustrated in the various drawing figures.

Embodiments of the present invention are directed to a compact removable voice handset for an integrated palmtop computer system/mobile phone. The present invention may be used in conjunction with a palmtop computer system (e.g., a personal digital assistant (PDA)). The PDA comprises electronics for wireless communications and a contact information database and a receiving slot for storing the handset.

In one embodiment, the handset is the overall length dimension of the PDA and is compact such that when placed in the receiving slot, there is minimal increase to the overall size and weight of the PDA. The present invention comprises a microphone and a speaker, and is communicatively coupled, via either a wireless connection or a wired connection, to the PDA. In one embodiment, the wireless connection is established by means of a Bluetooth transceiver located in both the handset and the PDA.

In one embodiment, the handset comprises control elements allowing it to be operated independent of the PDA. In one embodiment, a control element is used to control the volume of the speaker. In another embodiment, a control element is used to access a contact information database located in the PDA. In another embodiment, a control element is used to initiate or terminate wireless communications. In another embodiment, a control element is used to switch between volume control and database access activities.

In one embodiment, the handset comprises a display. In one embodiment, the display is operable to display record information of the contact information database stored in the PDA. In another embodiment, the display is operable to indicate the volume level of the handset. In another embodiment, the display is operable to indicate whether there is an incoming phone call.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Palmtop Computer System Platform

Figure 1:
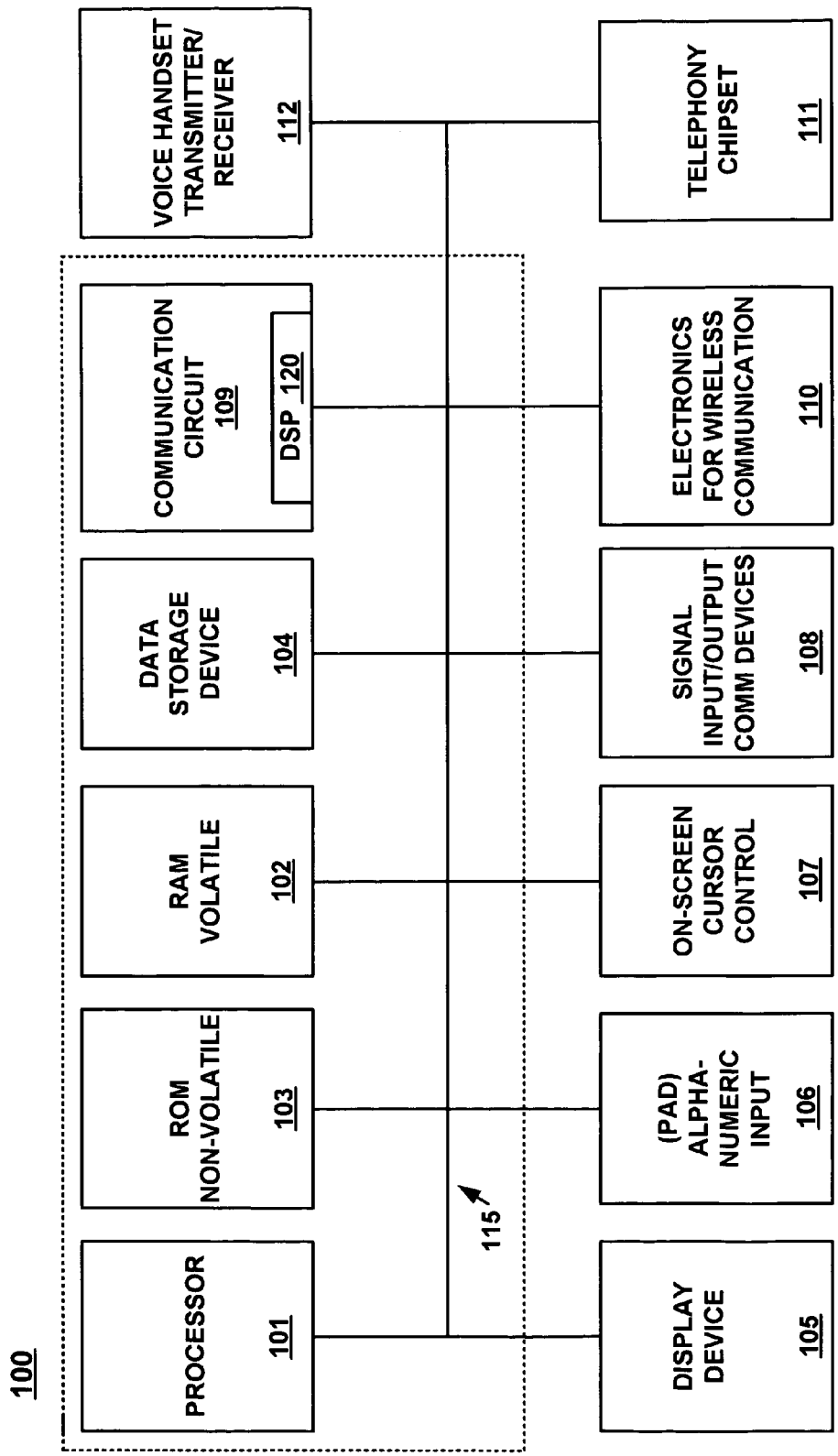
FIG. 1 is a block diagram of a portable computer system in accordance with an embodiment of the present invention.

FIG. 1 illustrates circuitry of exemplary computer system 100, some of which can be implemented on a board located inside a palmtop computer system. Computer system 100 includes an address/data bus 115 for communicating information, a central processor 101 coupled with the bus for processing information and instructions, a volatile memory 102 (e.g., random access memory, RAM) coupled with the bus 115 for storing information and instructions for the central processor 101 and a non-volatile memory 103 (e.g., read only memory, ROM) coupled with the bus 115 for storing static information and instructions for the processor 101. In one embodiment, non-volatile memory 103 comprises a contact information database, wherein the contact information database comprises user-entered contact information (e.g., telephone numbers and email addresses). Computer system 100 also includes an optional data storage device 104 (e.g., memory stick) coupled with the bus 115 for storing information and instructions. Device 104 can be removable. Computer system 100 also contains a display device 105 coupled to the bus 115 for displaying information to the computer user.

The board can contain the processor 101, the bus 115, the ROM 103 and the RAM 102. Computer system 100 also includes a signal transmitter/receiver device 108, which is coupled to bus 115 for providing a physical communication link between computer system 100 and a network environment.

Computer system 100 also includes a voice handset transmitter/receiver 112, which is coupled to bus 115 for providing a physical communication link between computer system 100 and a voice handset (e.g., compact removable voice handset 200 of FIG. 2A) for use in wireless communications. In one embodiment, voice handset transmitter/receiver 112 receives signals over a wireless connection (e.g., system 600 of FIG. 6A). In another embodiment, voice handset transmitter/receiver 112 receives signals over a wired connection (e.g., system 650 of FIG. 6B).

In one embodiment, computer system 100 includes a communication circuit 109 coupled to bus 115. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 1 is an optional alphanumeric input device 106 that in one implementation is a handwriting recognition pad ("digitizer"). Alphanumeric input device 106 is a user interface device and can communicate information and command selections to processor 101. In one embodiment, alphanumeric input device 106 is incorporated into display device 105. In one embodiment, a stylus is used to interact with alphanumeric input device 106.

Computer system 100 also includes an optional cursor control or directing device (on-screen cursor control 107) coupled to bus 115 for communicating user input information and command selections to processor 101. In one implementation, on-screen cursor control device 107 is a user interface device and is a touch screen device incorporated with display device 105. On-screen cursor control device 107 is capable of registering a position on display device 105 where the stylus makes contact. The display device 105 utilized with computer system 100 may be a flexible dual-sided display, a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flexible dual-sided display.

With reference still to FIG. 1, computer system 100 also includes wireless communication electronics 110, which is coupled with bus 115. In one embodiment, wireless communication electronics 110 comprises a microphone and a speaker.

In one embodiment, computer system 100 also includes a telephony chipset 111. Telephony chipset 111 enables computer system 100 to provide the functionality of a wireless phone (e.g., cellular phone) by providing the telephony functionality to transmit and receive cellular communications. In one embodiment, telephony chipset 111 is adapted to operate under the Global System for Mobile Communications (GSM) and the General Packet Radio Service (GPRS). GSM and GPRS are standards for wireless communications, and are common to the area of cellular communications. It should be appreciated that the present embodiment of telephony chipset 111 is well suited to be implemented in a wide variety of ways. For example, telephony chipset 111 operating under GSM/GPRS could be implemented as a modem.

Figure 2A:
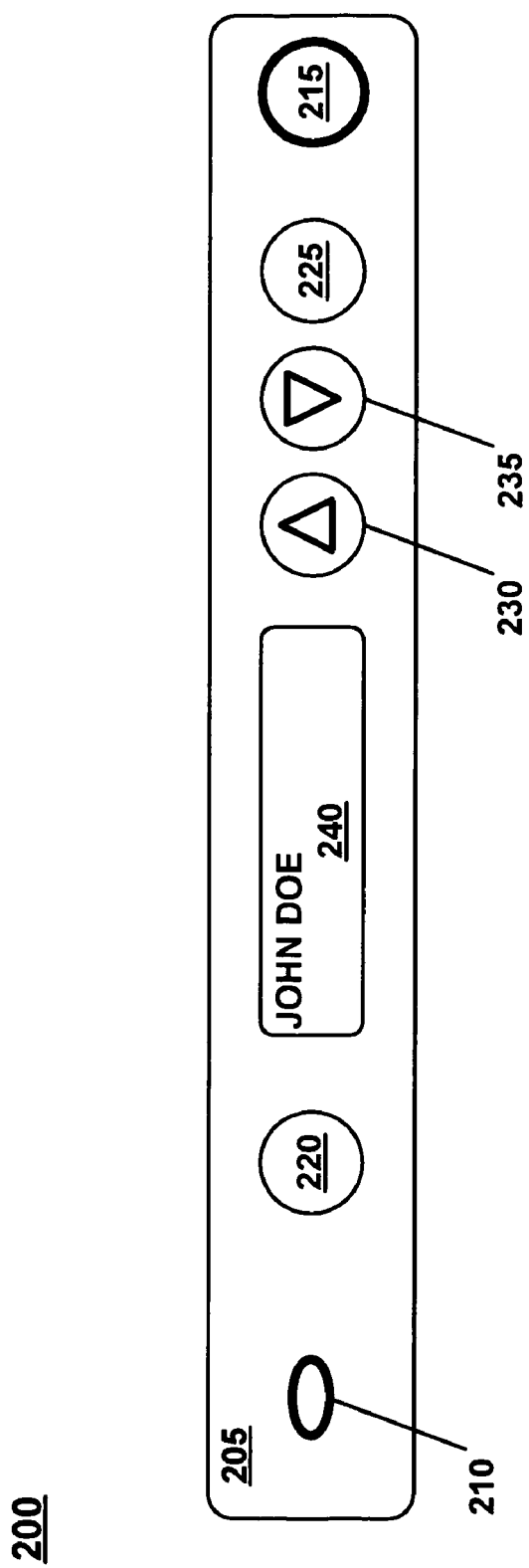
FIG. 2A illustrates a front view of a compact removable voice handset for use with an integrated palmtop computer system/cellular phone in accordance with one embodiment of the present invention.

Compact Removable Voice Handset for Use with an Integrated Palmtop Computer System/Cellular Phone FIG. 2A illustrates a front view of a compact removable voice handset 200 for use with an integrated palmtop computer system/cellular phone in accordance with one embodiment of the present invention. Handset 200 is communicatively coupled electronically to an integrated palmtop computer system/cellular phone (e.g., an integrated personal digital assistant (PDA)) by a wireless or wired connection (see FIGS. 6A and 6B, infra). Handset 200 comprises a microphone 210 and a speaker 215 both residing within housing 205. Handset 200 may be removably attached to the PDA when not in user by a user.

In one embodiment, handset 200 comprises a connect/disconnect button 220 for initiating and terminating wireless communications. For example, if a user were receiving an incoming phone call, the user would be connected to the phone call by activating connect/disconnect button 220. Similarly, the user would disconnect the phone call by activating connect/disconnect button 220.

In one embodiment, handset 200 comprises a menu button 225, up button 230, down button 235, and display 240. Menu button 225 allows a user to activate different functions of handset 200. In one embodiment, menu button allows a user to toggle through commands for controlling the volume of speaker 215 and for accessing the contact information database residing in the non-volatile memory of the accompanying palmtop computer system (e.g., non-volatile memory 103 of computer system 100 of FIG. 1). Certain record information from this database may be displayed within display screen 240.

Upon activating the volume control function by activating menu button 225, the volume level can be controlled by operating up button 230 and down button 235. For example, to increase the volume, a user would activate up button 230 and to decrease the volume a user would activate down button 235. In one embodiment, display 240 operates to display the volume level selected by a user.

Upon activating the function for accessing the contact information database by activating menu button 225, the user can browse through the contact information database as shown on display 240. In one embodiment, display 240 is a one-line display. By operating up button 230 and down button 235, a user can toggle through the contact information database. In one embodiment, once a user has toggled through to the desired contact, the user can initiate wireless communications (e.g., a cellular phone call) with that contact upon activating connect/disconnect button 220.

It should be appreciated that connect/disconnect button 220, menu button 225, up button 230, and down button 235 are not limited to buttons. They can take the form of many different control elements, including, but not limited to: toggle switches, roller balls, seesaw switches, and other similar control elements or on-screen icons. It should be appreciated that connect/disconnect button 220, menu button 225, up button 230, and down button 235 are defined by their respective functions, not their physical parameters.

Figure 2B:
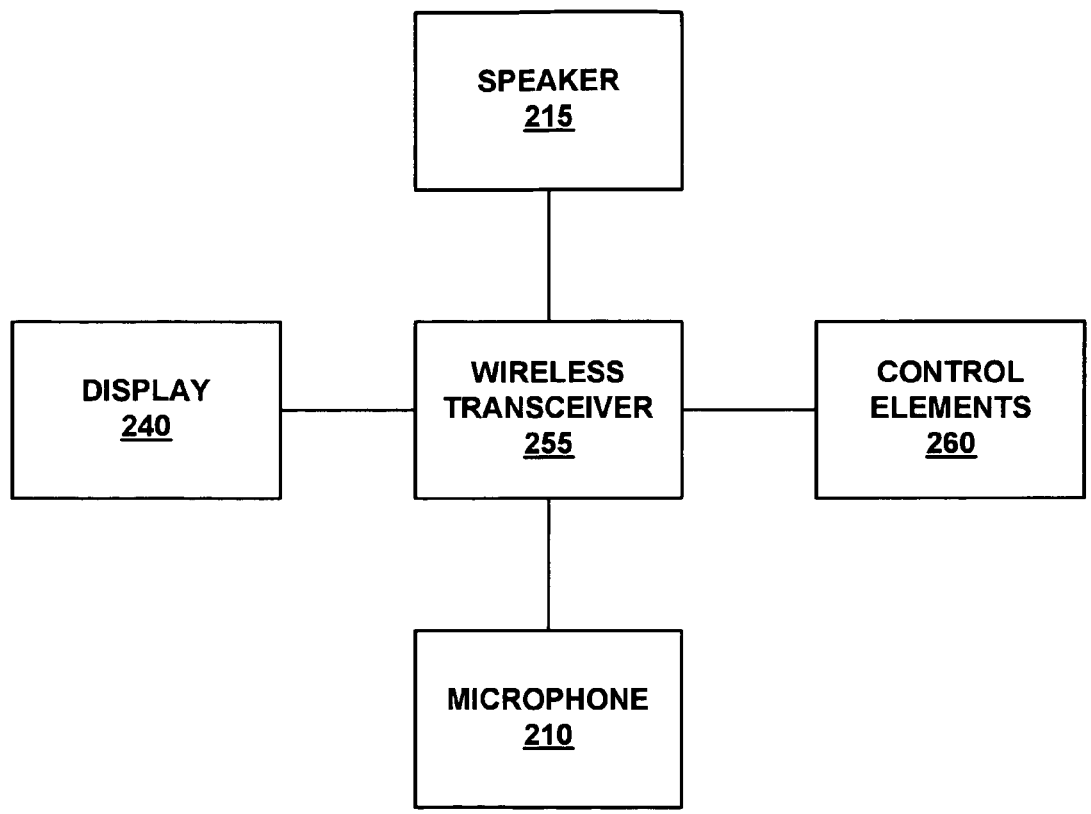
FIG. 2B is a block diagram of a compact removable voice handset with a wireless transceiver for use with an integrated palmtop computer system/cellular phone in accordance with an embodiment of the present invention.

FIG. 2B is a block diagram of a compact removable voice handset 250 with a wireless transceiver 255 for use with an integrated palmtop computer system/cellular phone in accordance with an embodiment of the present invention. In one embodiment, wireless transceiver 255 is coupled to microphone 210, speaker 215, display 240, and control elements 260.

In one embodiment, wireless transceiver 255 is a Bluetooth transceiver. In one embodiment, control elements 260 comprise a connect/disconnect control (e.g., connect/disconnect button 220 of FIG. 2A), a menu control (e.g., menu button 225 of FIG. 2A), a volume control, a database access control, and navigation controls (e.g., up button 230 and down button 235 of FIG. 2A).

Figure 2C:
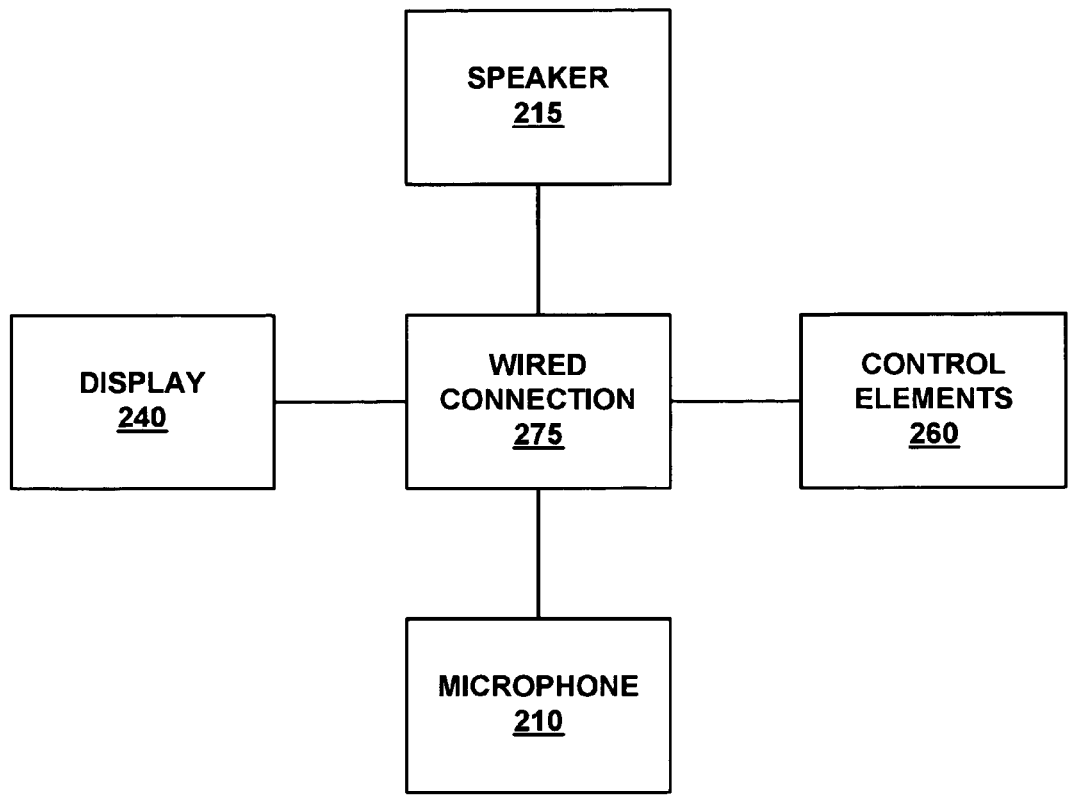
FIG. 2C is a block diagram of a compact removable voice handset with a wired connection to an integrated palmtop computer system/cellular phone in accordance with an embodiment of the present invention.

FIG. 2C is a block diagram of a compact removable voice handset 270 with a wired connection 275 to an integrated palmtop computer system/cellular phone in accordance with an embodiment of the present invention. In one embodiment, wired connection 275 is coupled to microphone 210, speaker 215, display 240, and control elements 260. In one embodiment, control elements 260 comprise a connect/disconnect control (e.g., connect/disconnect button 220 of FIG. 2A), a menu control (e.g., menu button 225 of FIG. 2A), a volume control, a database access control, and navigation controls (e.g., up button 230 and down button 235 of FIG. 2A).

Figure 3A:
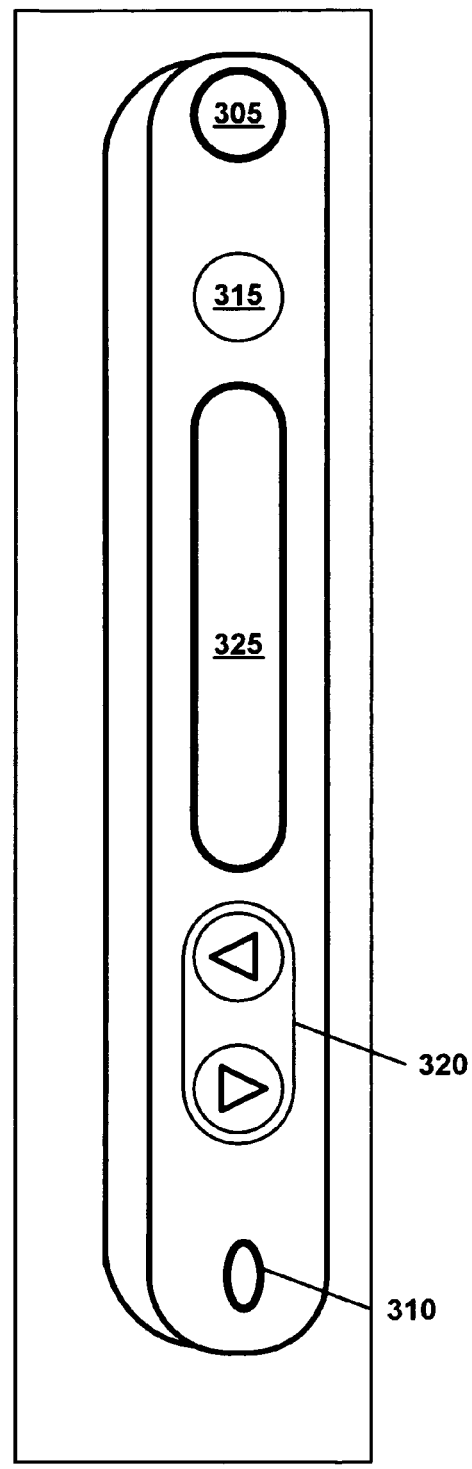
FIGS. 3A and 3B are perspective views of exemplary compact removable voice handset for use with an integrated palmtop computer system/cellular phone in accordance with embodiments of the present invention.
Figure 3B:
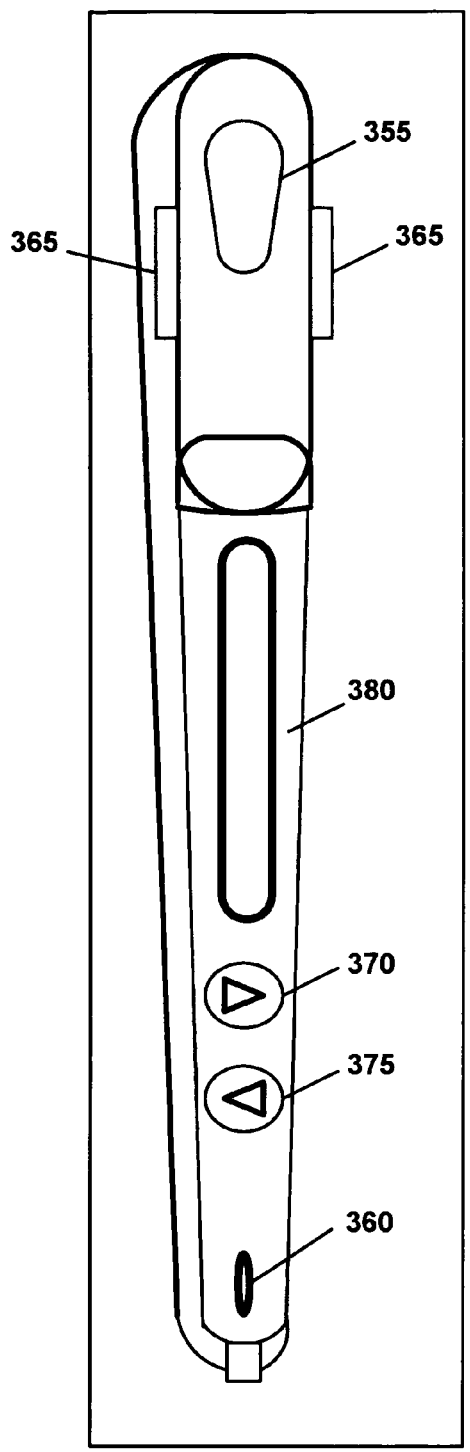

FIGS. 3A and 3B are perspective views of exemplary compact removable voice handsets for use with an integrated palmtop computer system/cellular phone in accordance with embodiments of the present invention. With reference first to FIG. 3A, compact removable voice handset 300 comprises speaker 305, microphone 310, connect/disconnect button 315, up/down seesaw button 320, and display 325.

With reference to FIG. 3B, compact removable voice handset 350 comprises speaker 355, microphone 360, buttons 365, up button 370, and down button 375, and display 380. Buttons 365 are customizable, and may be configured to operate commands such as connecting and disconnecting wireless communications and for toggling between menu commands (e.g., volume control and accessing contact information database).

It should be appreciated that compact removable voice handsets 300 and 350, of FIGS. 3A and 3B respectively, are exemplary in nature, and are in no way intended to limit the features or combinations of features of any one compact removable voice handset. The present invention is understood to comprise any combination of the above features and control elements, and compact removable voice handsets 300 and 350 are only intended to be examples of possible combinations of features and functions. For example, a compact removable voice headset may not comprise a display or may not comprise the ability to access an information database.

Thus, the present invention provides a compact removable voice handset for use with an integrated palmtop computer system/cellular phone. The present invention offers typical telephone functionality, while also offering features utilizing the functionality of a PDA (e.g., allowing a user to access contact information through the compact removable voice handset). As such, the present invention enhances the functionality of an integrated palmtop computer system/cellular phone by allowing a user to operate each device concurrently.

Figure 4A:
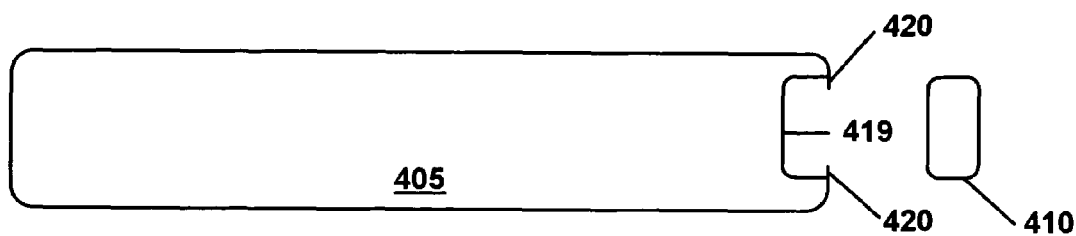
FIG. 4A illustrates a top view of an integrated palmtop computer system/cellular phone comprising a receiving port and a compact removable voice handset in accordance with one embodiment of the present invention.

FIG. 4A illustrates a top view of system 400 in accordance with one embodiment of the present invention. System 400 comprises integrated palmtop computer system/cellular phone 405 and compact removable voice handset 410, wherein integrated palmtop computer system/cellular phone 405 further comprises receiving port 419 and locking tabs 420. In the present embodiment, compact removable voice handset 410 is placed into receiving port 419 and is removably locked into place by locking tabs 420, thus connecting compact removable voice handset 410 to integrated palmtop computer system/cellular phone 405.

Figure 4B:
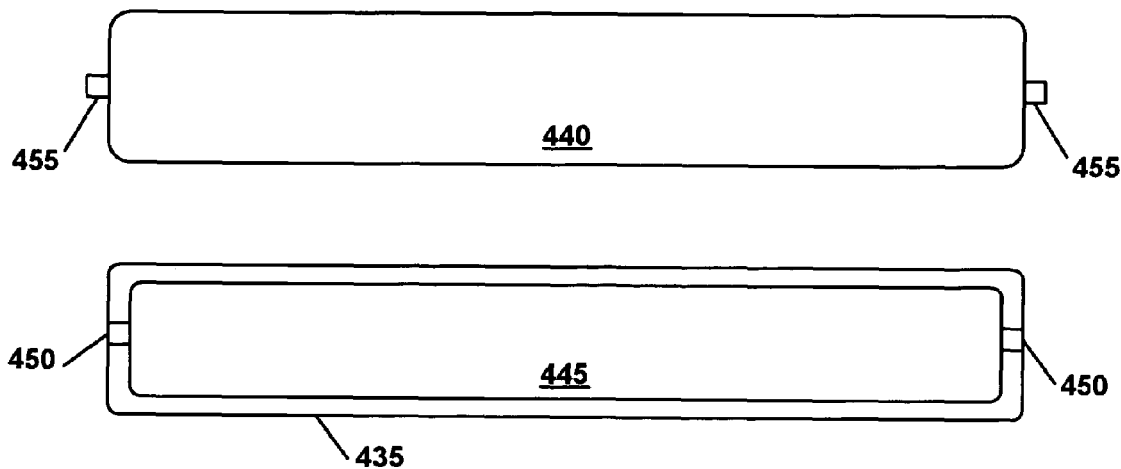
FIG. 4B illustrates a side view of an integrated palmtop computer system/cellular phone comprising a receiving port and a compact removable voice handset comprising spring-loaded locking tabs in accordance with one embodiment of the present invention.

FIG. 4B illustrates a side view of system 430 in accordance with one embodiment of the present invention. System 430 comprises integrated palmtop computer system/cellular phone 435 and a compact removable voice handset 440. Integrated palmtop computer system/cellular phone 41 further comprises receiving port 445 and tab receiving ports 450. Compact removable voice handset 440 further comprises spring-loaded locking tabs 455.

In the present embodiment, when compact removable voice handset 440 is placed in receiving port 445, spring-loaded locking tabs 455 extend into tab receiving ports 450, thus locking compact removable voice handset 440 into place. In one embodiment, spring-loaded locking tabs 455 are rounded, permitting easy use in locking and unlocking compact removable voice handset 440.

Figure 4C:
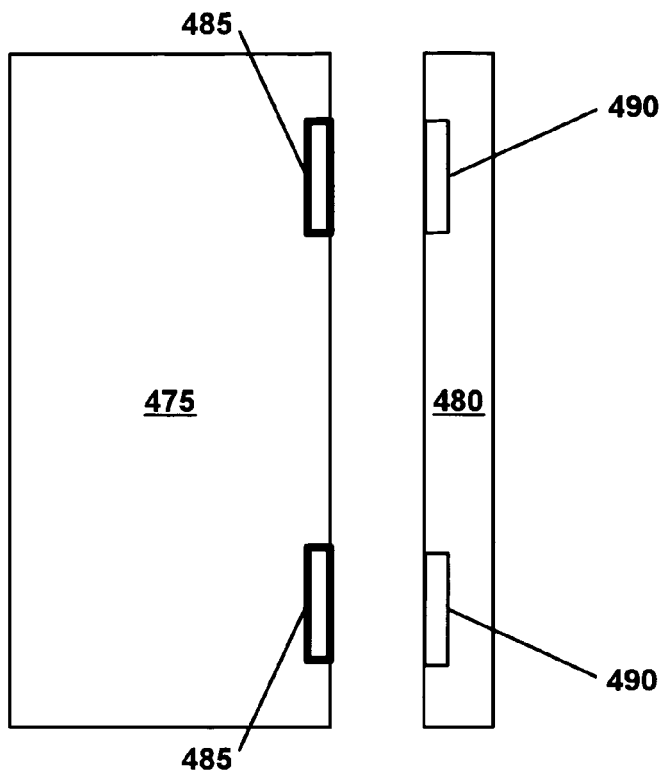
FIG. 4C illustrates a front view of an integrated palmtop computer system/cellular phone comprising magnets and a compact removable voice handset comprising metal plates in accordance with one embodiment of the present invention.

FIG. 4C illustrates a side view of system 470 in accordance with one embodiment of the present invention. System 470 comprises integrated palmtop computer system/cellular phone 475 and a compact removable voice handset 480. Integrated palmtop computer system/cellular phone 475 further comprises magnets 485. Compact removable voice handset 480 further comprises metal plates 490.

In the present embodiment, compact removable voice handset 480 is connected to integrated palmtop computer system/cellular phone 475 by lining up magnets 485 with metal plates 490. When magnets 485 are lined up with metal plates 490, compact removable voice handset 480 connects to integrated palmtop computer system/cellular phone 475, held in place by the magnetic connection. In one embodiment, integrated palmtop computer system/cellular phone 475 further comprises a receiving port for receiving compact removable voice handset 480. The receiving operates to line up magnets 485 with metal plates 490, thus resulting in a magnetic connection.

Figure 5A:
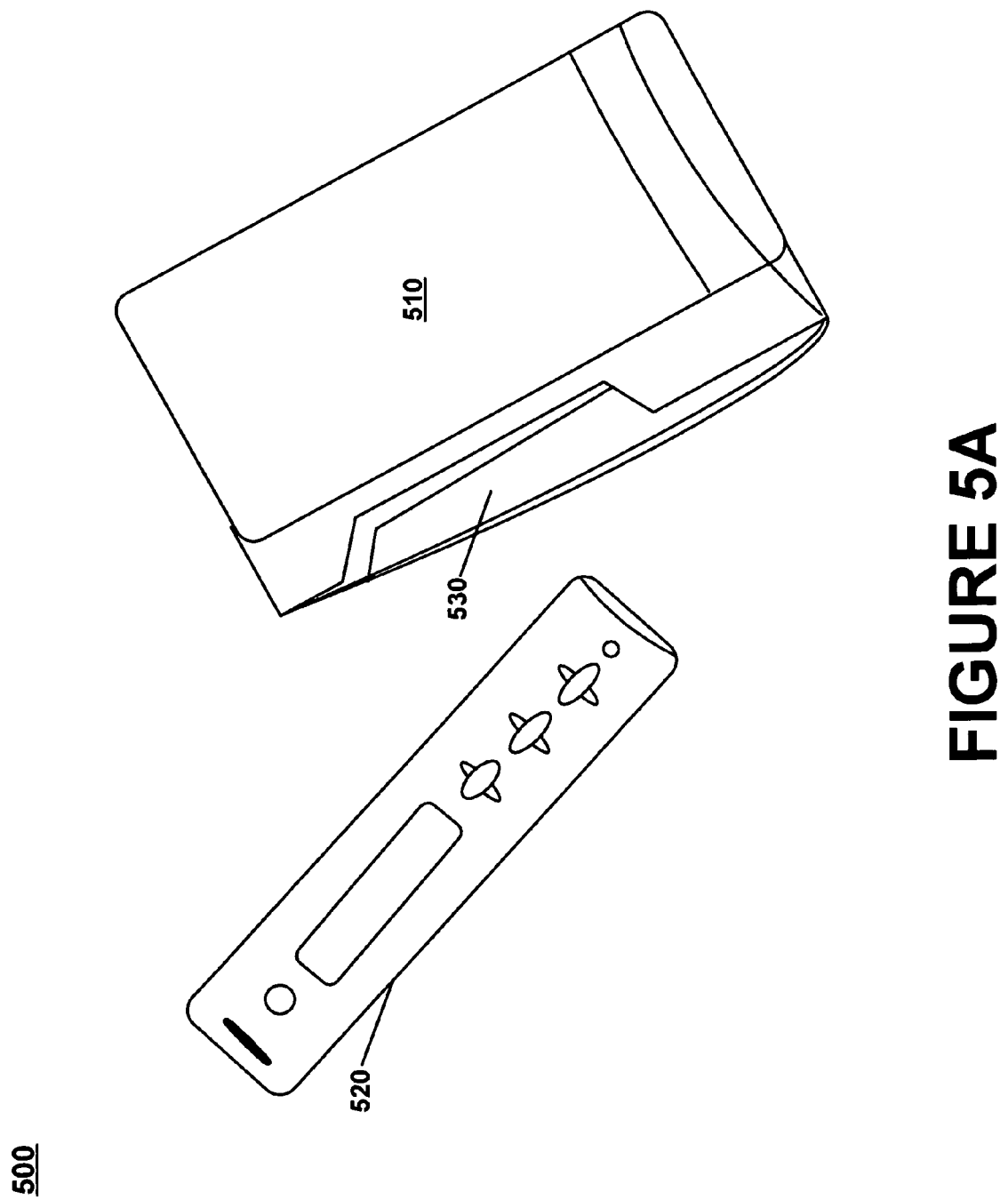
FIGS. 5A and 5B are perspective views of exemplary integrated palmtop computer system/cellular phone and exemplary compact removable voice handsets in accordance with embodiments of the present invention.
Figure 5B:
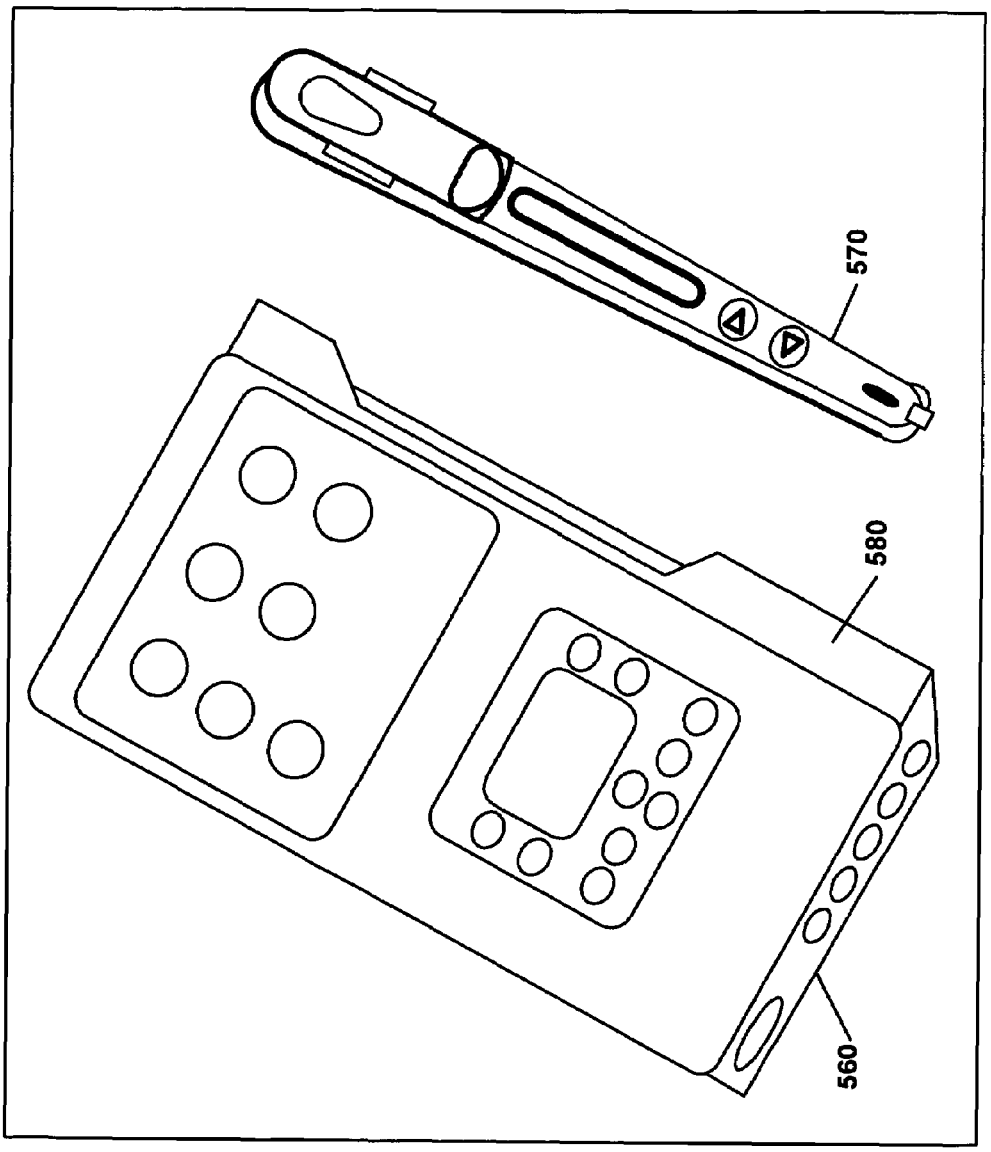

FIGS. 5A and 5B are perspective views of exemplary integrated palmtop computer system/cellular phones and exemplary compact removable voice handsets in accordance with embodiments of the present invention. With reference first to FIG. 5A, system 500 comprises integrated palmtop computer system/cellular phone 510 and exemplary compact removable voice handset 520, wherein integrated palmtop computer system/cellular phone 510 further comprises receiving port 530. Compact removable voice handset 520 is placed in receiving port 530 for attaching compact removable voice handset 520 to integrated palmtop computer system/cellular phone 510.

With reference to FIG. 5B, system 550 comprises integrated palmtop computer system/cellular phone 560 and exemplary compact removable voice handset 570, wherein integrated palmtop computer system/cellular phone 560 further comprises receiving port 580. Compact removable voice handset 570 is placed in receiving port 580 for attaching compact removable voice handset 570 to integrated palmtop computer system/cellular phone 560.

It should be appreciated that systems 500 and 550, of FIGS. 5A and 5B respectively, are exemplary in nature, regarding the means for attaching a compact removable voice handset to an integrated palmtop computer system/cellular phone. The present invention is understood to comprise any of the above described ways to attach a compact removable voice handset to an integrated palmtop computer system/cellular phone control elements, and systems 500 and 550 are only intended to be examples of possible ways for attachment.

Figure 6A:
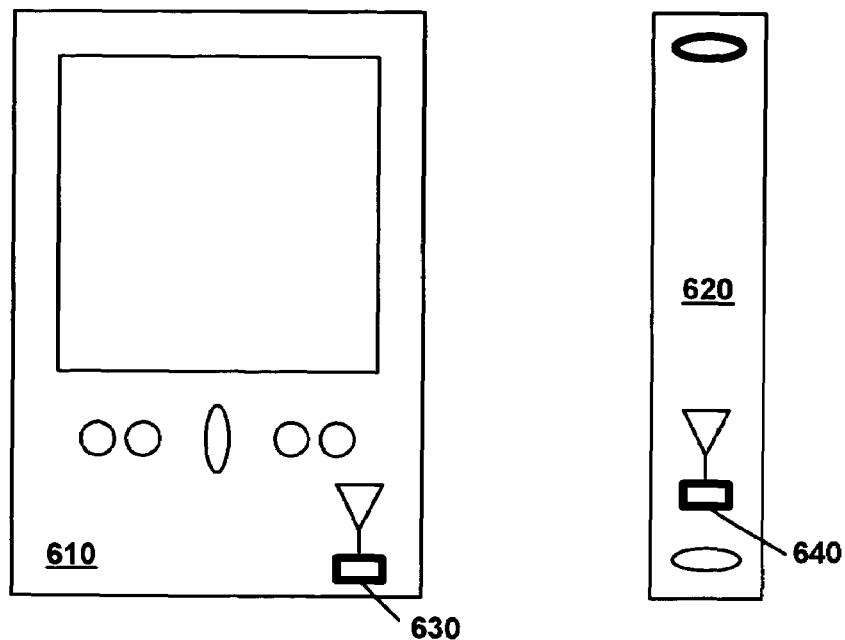
FIG. 6A illustrates a front view of a Bluetooth-enabled integrated palmtop computer system/cellular phone and a Bluetooth-enabled compact removable voice handset communicatively coupled by a wireless connection in accordance with one embodiment of the present invention.

FIG. 6A illustrates a front view of system 600 in accordance with one embodiment of the present invention. System 600 comprises integrated palmtop computer system/cellular phone 610 and compact removable voice handset 620 communicatively coupled by a wireless connection.

In one embodiment, integrated palmtop computer system/cellular phone 610 further comprises Bluetooth transceiver 630. Additionally, compact removable voice handset 620 further comprises Bluetooth transceiver 640. Bluetooth transceivers 630 and 640 are operable for transmitting and receiving data to and from each device. Bluetooth transceivers 630 and 640 are configured to transmit and receive voice data and contact information database data. In one embodiment, Bluetooth transceivers 630 and 640 reside within the housing of the respective device.

In one embodiment, Bluetooth transceiver 630 is coupled to the electronics resident in integrated palmtop computer system/cellular phone 610 (e.g., voice handset transmitter/receiver 112 of FIG. 1). Likewise, Bluetooth transceiver 640 is coupled to the electronics resident in compact removable voice handset 620.

Figure 6B:
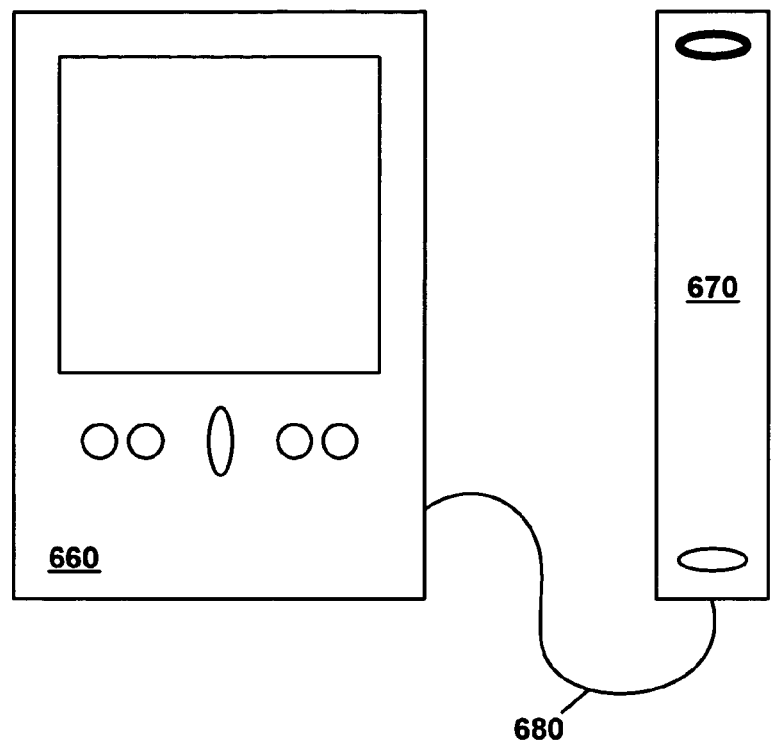
FIG. 6B illustrates a front view of an integrated palmtop computer system/cellular phone and a compact removable voice handset communicatively coupled by a wired connection in accordance with one embodiment of the present invention.

FIG. 6B illustrates a front view of a system 650 in accordance with one embodiment of the present invention. System 650 comprises integrated palmtop computer system/cellular phone 660 and compact removable voice handset 670 communicatively coupled by a wired connection over wire 680. Wire 680 is configured to transmit and receive voice data and contact information database data.

In one embodiment, wire 680 couples the electronics resident in integrated palmtop computer system/cellular phone 660 (e.g., voice handset transmitter/receiver 112 of FIG. 1) to the electronics resident in compact removable voice handset 670.

The wireless connection of FIG. 6A and the wired connection of FIG. 6B are for transmitting voice data and contact database information to and from an integrated palmtop computer system/cellular phone and a compact removable voice handset.

The present invention provides an electronic device that is both a palmtop computer system and a cellular phone offering the immediacy required for answering a phone call and still allowing for the accessibility of the palmtop computer system. The present invention provides the benefits of both a palmtop computer system and a cellular phone in one integrated device by allowing for common operations and functionality without compromising the form factor of either device.

The preferred embodiment of the present invention, compact removable voice handset for an integrated palmtop computer system/mobile phone, is thus described. While the present invention has been described in particular embodiments, it should be appreciated that the present invention should not be construed as limited by such embodiments, but rather construed according to the below claims.

What is claimed is:

1. A data communication module adapted to communicatively couple to a computing device, said data communication module comprising:

a microphone;

a speaker adapted to present auditory information;

a wireless transceiver coupled to said microphone and said speaker, said wireless transceiver adapted to receive data from said computing device;

a display device coupled to said wireless transceiver and adapted to display data received from said computing device, wherein said data comprises display information such that said wireless transceiver is adapted to transform said data received from said computing device into said display information for display at said display device; and a control element coupled to said wireless transceiver; wherein said data communication module is detachable from and attachable to a housing of said computing device while maintaining the form factor of said housing, wherein said control element comprises a database access control for accessing a database of said computing device and for selecting said information from said database for display on said display device.

2. The data communication module of claim 1 wherein said wireless transceiver is a Bluetooth transceiver.

3. The data communication module of claim 1 wherein said control element is adapted to transmit a command to said computing device.

4. The data communication module of claim 1 wherein said control element comprises a button adapted to initiate a data transmission from said computing device.

5. The data communication module of claim 1 wherein said control element comprises a button adapted to disconnect a data transmission received at said computing device.

6. The data communication module of claim 1 wherein said data communication module and said computing device work in combination to provide voice communications to other devices using a component of said computing device, wherein said data communication module does not comprise said component.

7. The data communication module of claim 1 wherein said data comprises auditory information such that said wireless transceiver is adapted to transform said data received from said computing device into said auditory information for presentation at said speaker.

8. The data communication module of claim 1 wherein said control element comprises navigation controls.

9. The data communication module of claim 1 wherein said control element further comprises a menu control.

10. The data communication module of claim 1 wherein said speaker provides a receiving unit for said computing device when said data communication module is attached to said housing.

11. The data communication module of claim 1 wherein functionality provided by said computing device is accessible via said data communication module.

12. The data communication module of claim 1 wherein said control element is operable for remotely controlling browsing of information residing in memory on said computing device, wherein during said browsing information residing in said memory is selectively displayed on said display device.

13. A system of electronic devices comprising:

a first device comprising a microphone, a display, at least one button, a wireless transceiver, and a speaker, wherein said first device does not comprise telephony hardware for providing independent telephony functionality; and a second device comprising a processor, a memory unit coupled to said processor, electronics for wireless communications coupled to said processor, a display coupled to said processor, and a telephony chipset for providing telephony functionality; wherein said first device is communicatively coupled by a wireless connection to said second device and wherein said first device and said second device work in combination to provide the capability for wireless communications with one or more other devices using said telephony chipset of said second device, and wherein a button of said first device is operable for remotely controlling browsing of information residing in said memory unit of said second device, wherein during said browsing information residing in said memory unit is selectively displayed on said display of said first device; wherein said first device is attachable to and detachable from said second device while maintaining the outline of said second device.

14. The system of claim 13 wherein functionality provided by said second device is accessible via said first device.

15. The system of claim 13 wherein said first and second devices exchange data via said wireless connection.

* * * * *